(12) United States Patent
Kano et al.

(10) Patent No.: US 7,941,693 B2
(45) Date of Patent: *May 10, 2011

(54) DISK ARRAY APPARATUS AND METHOD FOR CONTROLLING THE SAME

(75) Inventors: Azuma Kano, Hiratsuka (JP); Xiaoming Jiang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,169

(22) Filed: Aug. 3, 2009

(65) Prior Publication Data

US 2009/0292945 A1 Nov. 26, 2009

Related U.S. Application Data

(63) Continuation of application No. 11/212,876, filed on Aug. 29, 2005, now Pat. No. 7,607,035.

(30) Foreign Application Priority Data

Jun. 6, 2005 (JP) ................................ 2005-166227

(51) Int. Cl.
*G06F 11/00* (2006.01)
(52) U.S. Cl. .......................................................... 714/5
(58) Field of Classification Search .................. 714/6, 5, 714/7, 42; 711/104, 114
See application file for complete search history.

(56) References Cited

U.S. PATENT DOCUMENTS

| 4,870,643 | A | 9/1989 | Bultman et al. |
|---|---|---|---|
| 5,159,597 | A | 10/1992 | Monahan et al. |
| 5,313,585 | A | 5/1994 | Jeffries et al. |
| 5,559,958 | A | 9/1996 | Farrand et al. |
| 5,574,855 | A | 11/1996 | Rosich et al. |
| 5,828,583 | A | 10/1998 | Bush et al. |
| 6,058,489 | A | 5/2000 | Schultz et al. |
| 6,081,812 | A | 6/2000 | Boggs et al. |
| 6,327,679 | B1 | 12/2001 | Russell |
| 6,408,358 | B1 | 6/2002 | Uchiyama et al. |
| 6,484,229 | B1 | 11/2002 | Ichikawa et al. |
| 6,690,532 | B1 | 2/2004 | Choo et al. |
| 6,742,139 | B1 | 5/2004 | Forsman et al. |
| 7,003,689 | B2 | 2/2006 | Arakawa |
| 7,130,144 | B2 | 10/2006 | Kano et al. |
| 2002/0038436 | A1* | 3/2002 | Suzuki ............................. 714/6 |

(Continued)

FOREIGN PATENT DOCUMENTS

JP 4232534 8/1992

(Continued)

*Primary Examiner* — Scott T Baderman
*Assistant Examiner* — Yair Leibovich
(74) *Attorney, Agent, or Firm* — Brundidge & Stanger, P.C.

(57) ABSTRACT

A disk array apparatus capable of reducing a disk drive fault rate where a time-out failure has occurred. The disk array apparatus includes a plurality of disk drives, and a control unit for performing data input/output processing of the disk drives in response to a data input/output request from a host system. The control unit includes: a memory for storing control information for specifying a failure of at least one of the disk drives, and failure information of the faulty disk drive, a circuit for specifying, from the failure information, the disk drive in which a time-out failure has occurred, and issuing an instruction to retry a control command to the disk drive, and a circuit for outputting a control signal to the faulty disk drive in order to hard reset the disk drive if the disk drive does not recover from the failure.

22 Claims, 10 Drawing Sheets

U.S. PATENT DOCUMENTS

| | | |
|---|---|---|
| 2002/0042893 A1 | 4/2002 | Larson et al. |
| 2002/0049923 A1 | 4/2002 | Kanazawa et al. |
| 2003/0093721 A1 | 5/2003 | King et al. |
| 2003/0191890 A1 | 10/2003 | Okamoto et al. |
| 2004/0054849 A1 | 3/2004 | Deenadhayalan et al. |
| 2004/0236908 A1 | 11/2004 | Suzuki et al. |
| 2005/0204078 A1* | 9/2005 | Steinmetz et al. ............... 710/38 |

FOREIGN PATENT DOCUMENTS

| | | |
|---|---|---|
| JP | 08286844 | 11/1996 |
| JP | 2000187561 | 7/2000 |
| JP | 2002023967 | 1/2002 |
| JP | 2002297322 | 10/2002 |
| JP | 2002358170 | 12/2002 |
| JP | 2003257130 | 9/2003 |
| JP | 2004022059 | 1/2004 |
| JP | 2004096383 | 3/2004 |
| JP | 2004227449 | 8/2004 |
| JP | 2004348876 | 12/2004 |

* cited by examiner

FIG.10
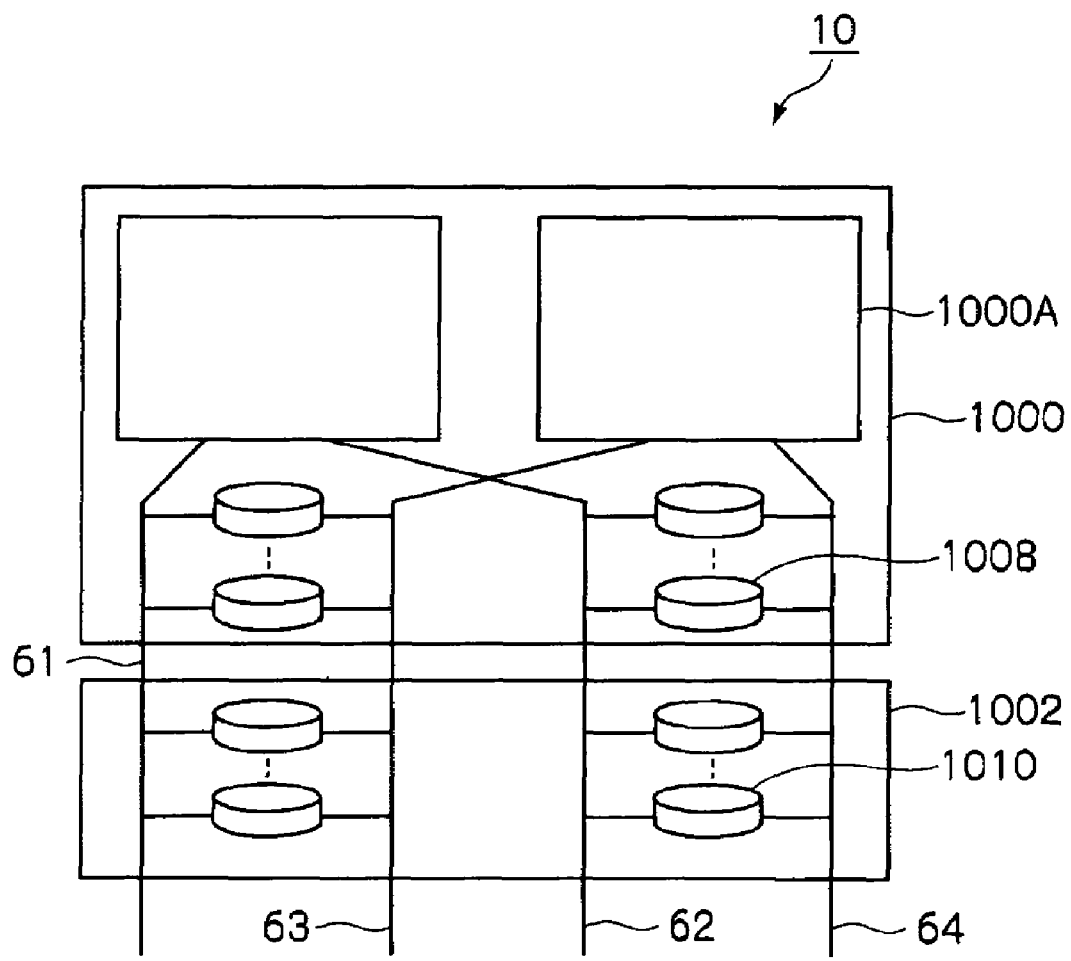
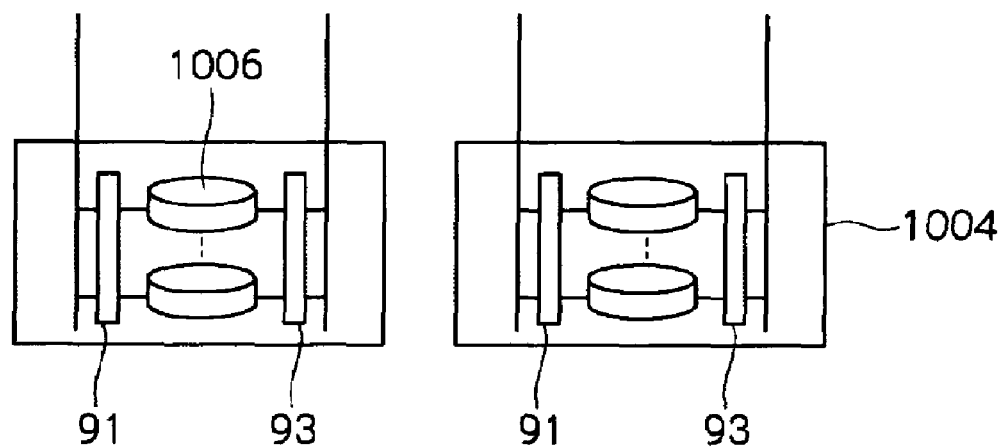

DISK ARRAY APPARATUS AND METHOD FOR CONTROLLING THE SAME

CROSS-REFERENCE TO RELATED APPLICATION

The present application is a continuation application of application Ser. No. 11/212,876, filed Aug. 29, 2005, now U.S. Pat. No. 7,607,035; which relates to and claims priority from Japanese Patent Application No. 2005-166227, filed on Jun. 6, 2005, the entire disclosure of which is incorporated herein by reference.

BACKGROUND OF THE INVENTION

The present invention relates to a disk array apparatus and a method for controlling the disk array apparatus. More particularly, this invention relates to an improvement of a function to restore a disk drive from a failure.

Recently, in line with the advances in IT technology, attempts have been made to achieve high performance, high capacity, and low cost in a disk array apparatus as a storage controller. The disk array apparatus includes a large number of disk drives allocated in an array. The logical configuration of the disk drives allocated in an array is based on RAID (Redundant Arrays of Independent [or Inexpensive] Disks). A host computer issues a write-access command or a read-access command to the disk array apparatus and is thereby capable of reading or writing data from or to a disk drive.

Japanese Patent Laid-Open (Kokai) Publication No. 2004-348876 discloses an example of the above-described type of disk array apparatus. As shown in FIG. 5 of this publication, the disk array apparatus includes a controller 100. The controller 100 has: a communication control unit 110 for accepting data input/output requests; a disk controller 120 for controlling disk drives 51α and 51β; and a cache memory 62 for temporarily storing data sent and received between the communication control unit and the disk controller. The controller 110 sends and receives data to and from the disk drive 51β, which has a different interface, via the disk controller 120 and a converter 170.

Moreover, Japanese Laid-Open (Kokai) Publication No. 2002-23967 discloses a drive failure recovery method comprising the steps of: physically moving a storage medium relative to a drive device; performing processing to reboot the drive device; performing processing to hard reset the drive device; and turning off or repowering the drive device; wherein the processing proceeds in the order of the above-listed steps and terminates when the drive device recovers from a failure in any of the steps.

SUMMARY OF THE INVENTION

The disk array apparatus described in Japanese Patent Laid-Open (Kokai) Publication No. 2004-348876 includes disk drives with different kinds of interfaces, and the reliability of the disk drive devices varies depending on the type of disk drive. For example, in an FC drive that employs Fibre Channel as its interface and whose communication control is complicated, a temporal time-out trouble often occurs. Although this time-out trouble is a temporal failure of the relevant disk drive hardware or software, the disk drive cannot be recovered by retry processing. Therefore, when a time-out failure occurs in a disk drive, the faulty disk drive is locked-out and replaced by another disk drive. Despite the fact that a time-out failure can be normally recovered, the above-described solution not only leads to waste of disk drive resources, but also entails the burden of the work to replace the disk drive.

Moreover, Japanese Patent Laid-Open (Kokai) Publication No. 2002-23967 describes some means as the method for restoring a disk drive from a failure. However, it does not refer to a time-out failure of a disk drive or a method for restoring the disk drive from a time-out failure.

It is an object of the present invention to provide a disk array apparatus and a method for controlling the disk array apparatus that can reduce a disk drive's fault rate and secure reliability of data by providing a new technique to restore a disk drive in which a time-out failure has occurred. It is another object of this invention to suppress the waste of disk drive resources and the burden of work to replace the disk drive. It is still another object of the invention to provide a disk array system and method that can effectively recover the data in which the failure has occurred when hard resetting the disk drive where the failure has occurred.

In order to achieve the above-described objects, the disk array apparatus of the present invention aims to reduce a disk drive's fault rate by recovering a disk drive in which a time-out failure has occurred, by means of hard resetting.

One aspect of this invention is a disk array apparatus including: a plurality of disk drives; and a control unit for performing data input/output processing of the disk drives in response to a data input/output request from a host system; wherein the control unit includes: a memory for storing control information for specifying a failure of at least one of the disk drives, and failure information of the faulty disk drive; a circuit for specifying, from the failure information, the disk drive in which a time-out failure has occurred, and issuing an instruction to retry a control command to the disk drive; and a circuit for outputting a control signal to the faulty disk drive in order to hard reset the disk drive if the disk drive does not recover from the failure.

The term "failure" or "faulty" used in relation to this invention means both the state where a failure occurs in a disk drive, and the state of "suspected failure."

Another aspect of the invention is a disk array apparatus including a dual controller for performing data input/output processing of disk drives in response to a data input/output request from a host system, wherein the dual controller includes: a main controller for performing the data input/output processing;
a Fibre Channel protocol controller for interface connection to the host system via a front interface connection Fibre Channel, and for interface connection to the disk drive via a back interface connection Fibre Channel; two FC-ALs for loop connection to the disk drives; a connection switching circuit for switching connection of one selected FC-AL, of the two FC-ALs, to the back interface connection Fibre Channel; a plurality of switching circuits for connecting the respective disk drives to the FC-ALs; and an enclosure controller for controlling the switching circuits; wherein the main controller includes: a memory for storing control information for specifying a failure of at least one of the disk drives, and failure information of the faulty disk drive; a circuit for specifying, from the failure information, the faulty disk drive in which a time-out failure has occurred, and issuing an instruction to retry a control command from the enclosure controller to the faulty disk drive; and a circuit for outputting a control signal from the enclosure controller to the faulty disk drive in order to hard reset the disk drive if the faulty disk drive does not recover from the failure.

Still another aspect of the invention is a disk array apparatus including: a plurality of disk drives; and a control unit for performing data input/output processing of the disk drives in response to a data input/output request from a host system; wherein the control unit includes: a memory for storing control information for specifying a failure of at least one of the disk drives, and failure information of the faulty disk drive; a circuit for specifying, from the failure information, the disk drive in which a time-out failure has occurred, and issuing an instruction to retry a control command to the disk drive; a circuit for outputting a control signal to the faulty disk drive in order to lock-out the disk drive if the disk drive does not recover from the failure; and a circuit for outputting a reset signal to the faulty disk drive in order to hard reset it; wherein during the hard reset period of the faulty disk drive, the control unit recovers, from information stored on the other disk drives, storage data on the read-accessed faulty disk drive and provides the recovered storage data to the host system.

A further aspect of the invention is a method for controlling a disk array apparatus including a plurality of disk drives and a control unit for performing data input/output processing of the disk drives in response to a data input/output request from a host system, the method including the steps of: specifying a failure of at least one of the disk drives; storing failure information of the faulty disk drive; judging from the failure information that a time-out failure has occurred; instructing the disk drive, in which the time-out failure has occurred, to retry a control command; and hard resetting the faulty disk drive if the faulty disk drive does not recover from the failure.

As described above, this invention can provide a disk array apparatus and a method for controlling the disk array apparatus that can reduce a disk drive's fault rate and enhance the reliability of data stored in the disk drives by providing a technique to restore disk drives in which a time-out trouble or failure has occurred.

BRIEF DESCRIPTION OF THE DRAWINGS

FIG. 10 is a hardware block diagram of a disk array apparatus including different kinds of disk drives.

DETAILED DESCRIPTION OF THE INVENTION

Embodiments of this invention are described below in detail with reference to the attached drawings. The respective embodiments do not limit the scope of the claims and all characteristics described in the embodiments are not necessarily indispensable as the means for solving the problems of this invention.

Figure 1:
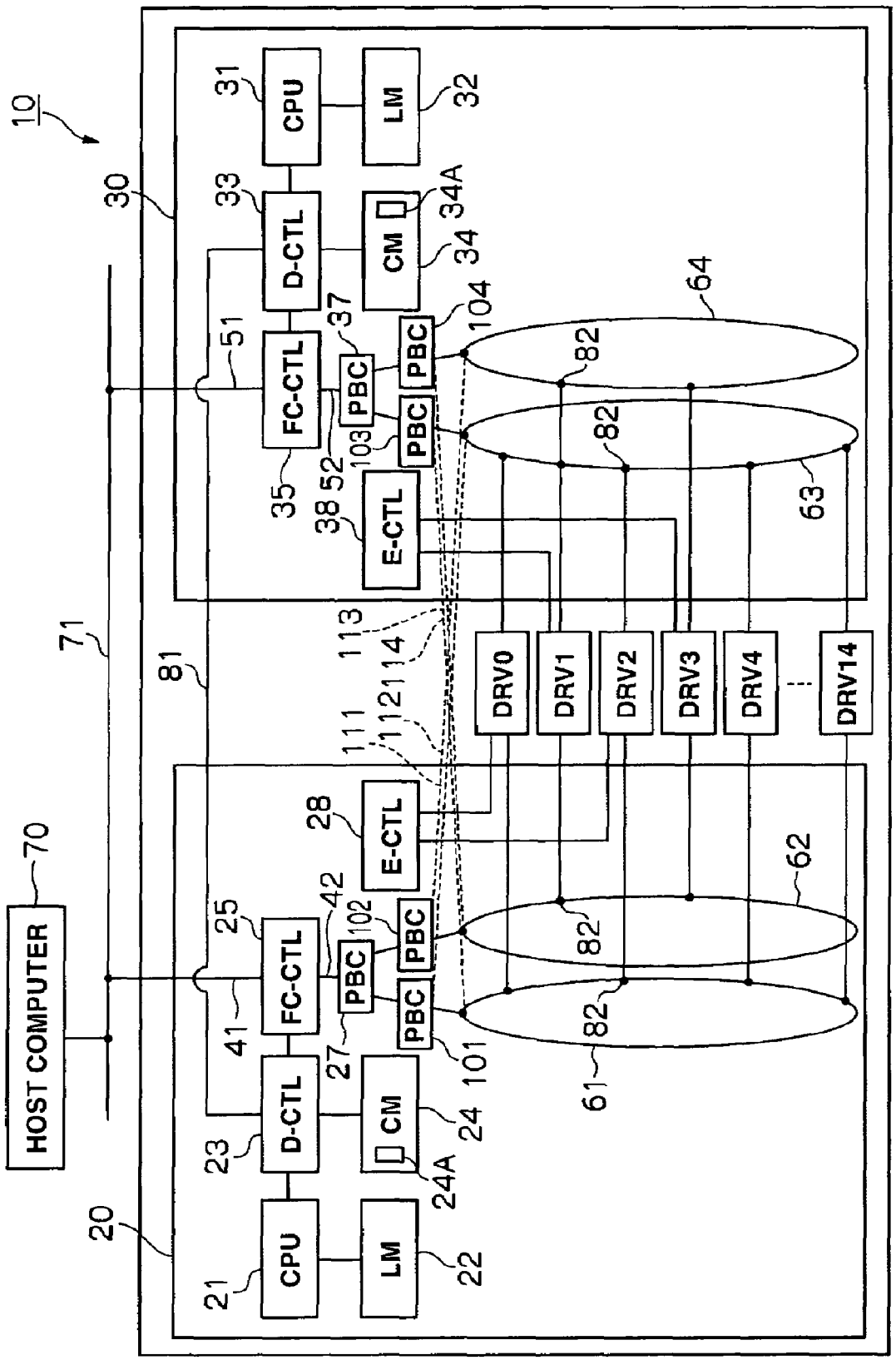
FIG. 1 is a hardware configuration block diagram of a disk array apparatus according to an embodiment of this invention.

FIG. 1 shows the configuration of a disk array apparatus 10 according to an embodiment of this invention. The disk array apparatus 10 is connected to a host compute (or host system) 70 via a communication network 71. The host computer 70 is, for example, a server, a personal computer, a workstation, or a mainframe that functions as the host system of the disk array apparatus 10. Examples of the communication network 71 include a LAN (Local Area Network), a SAN (Storage Area Network), the Internet, or private lines.

In a case of the open-type host computer, data transfer is conducted according to communication protocols such as TCP/IP (Transmission Control Protocol/Internet Protocol), FCP (Fibre Channel Protocol), and iSCSI (internet Small Computer System Interface). In a case of the mainframe-type host computer, data transfer is conducted according to communication protocols such as FICON (Fibre Connection®), ESCON (Enterprise System Connection®), ACONARC (Advanced Connection Architecture®), and FIBARC (Fibre Connection Architecture®). It is also possible to incorporate a NAS (Network Attached Storage) function designed to accept data output requests from the host computer 70 by file name designation under control of protocols such as NFS (Network File System).

The disk array apparatus 10 employs a dual controller configuration that includes double controllers 20 and 30 (which correspond to the "control unit" in claims). The main components of the controller 20 are: a CPU 21; a local memory (LM) (system memory) 22; a data controller (D-CTL) 23; a cache memory (CM) 24; a Fibre Channel protocol controller (FC-CTL) 25; a PBC (Port Bypass Circuit) 27; an enclosure controller (E-CTL) 28; and FC-ALs (Fibre Channel Arbitrated Loops) 61 and 62.

The CPU 21 is the processor that controls data input/output processing (such as write-access and read-access) of a plurality of disk drives in response to a data input/output request from the host computer 70. It controls the data controller 23, the Fibre Channel protocol controller 25, and the PBC 27 (switching circuit) by running micro programs stored in the local memory 22.

Under the control of the CPU 21, the data controller 23 controls data transfer between the Fibre Channel protocol controller 25 and the cache memory 24. The cache memory 24 temporarily stores data sent and received between a front interface and a back interface via the Fibre Channel protocol controller 25.

The Fibre Channel protocol controller 25 is connected, via a front interface connection Fibre Channel 41, to the host computer 70 and has the function of receiving block access requests according to the Fibre Channel Protocol. Moreover, the Fibre Channel protocol controller 25 is connected, via a back interface connection Fibre Channel 42, to disk drives DRV0 to DRV14 and has the function of sending data input/output requests to the disk drives DRV0 to DRV14 according to the protocols that specify commands and the like controlling the disk drives DRV0 to DRV14.

The PBC 27 selects either one of or both the two FC-ALs 61 and 62 to be connected to the back interface connection Fibre Channel 42 and switches the connection as appropriate. The FC-AL 61 is loop-connected, via a PBC 82 mounted on the FC-AL 61, to the even-number disk drives DRV0, DRV2, and so on to DRV14. The FC-AL 62 is loop-connected, via a PBC 82 mounted on the FC-AL 62, to the odd-number disk drives DRV1, DRV3, and so on to DRV13.

The PBC 82 is an electronic switch to automatically open or close the FC-AL 61 or 62 in order to minimize failures in the system operation and enable addition or deletion of nodes. The PBC 82 has the function of bypassing and electrically excluding the Fibre Channel protocol controller 25 and the disk drives DRV0 to DRV14 from the FC-ALs 61 and 62.

For example, the PBC 82 disconnects any one of the disk drives DRV0 to DRV14, in which a failure has occurred, from the FC-ALs 61 and 62, thereby enabling communications between the other disk drives DRV0 to DRV14 and the Fibre Channel protocol controller 25. The PBC 82 also enables addition and removal of the disk drives DRV0 to DRV14 while maintaining the operation of the FC-ALs 61 and 62. If a new disk drive, DRV15 (not shown in the drawing) for example, is installed, the PBC 82 incorporates the disk drive DRV15 into the FC-ALs 61 and 62 and enables communications between the disk drive DRV15 and the Fibre Channel protocol controller 25.

The enclosure controller (E-CTL) 28 controls the SES (SCSI Enclosure Services) drives. The SES drives have and can perform SES (SCSI Enclosure Services) and ESI (Enclosure Service I/F) functions specified in SCSI-3 (Small Computer System Interface 3) standards. The SES drives can communicate not only with FC-ALs 61 to 64, but also with the enclosure controller 28. In this embodiment, the four disk drives DRV0 to DRV3, two for each FC-AL 61 or 62, are SES drives. However, all the disk drives DRV0 to DRV14 can be SES drives.

On the other hand, the controller 30 has a similar configuration to that of the controller 20. Main components of the controller 30 are: a CPU 31; a local memory (LM) 32; a data controller (D-CTL) 33; a cache memory (CM) 34; a Fibre Channel protocol controller (FC-CTL) 35; a PBC 37; an enclosure controller (E-CTL) 38; a front interface connection Fibre Channel 51; a back interface connection Fibre Channel 52; and FC-ALs 63 and 64. The PBC 37 selects either one of or both of the two FC-ALs 63 and 64 to be connected to the back interface connection Fibre Channel 52 and switches the connection as appropriate. The FC-AL 63 is loop-connected, via the PBCs 82, to the even-number disk drives DRV0, DRV2, and so on to DRV14. The FC-AL 64 is loop-connected, via the PBCs 82, to the odd-number disk drives DRV1, DRV3, and so on to DRV13.

The data controllers 23 and 33 are mutually connected via a bus 81. One data controller 23 (or 33) can transfer commands or data to the other data controller 33 (or 23) via the bus 81. For example, if both the controllers 20 and 30 share their work load and access the same logical volume, it is possible to transfer write data or read data between the controllers 20 and 30.

The controllers 20 and 30 can control the disk drives DRV0 to DRV14 according to RAID levels (for example, level 0, 1, 5, or 6) defined with regard to the RAID system. In other words, a plurality of disk drives constitutes a RAID group; and even if a failure occurs in one disk drive, it is possible to reproduce data of the faulty disk drive in which the failure has occurred from the other disk drives' parity data.

In the RAID system, a plurality of disk drives DRV0 to DRV14 are managed as one group (hereinafter referred to as the "RAID group"). Logical volumes that are units of access from the host computer 70 are formed in the RAID group. Each logical volume is given an identifier called an "LUN (Logical Unit Number)."

PBCs 101 and 102 are installed respectively between the PBC 27 and the FC-ALs 61 and 62. If a failure occurs in the FC-AL 61, the PBC 101 connects the back interface connection Fibre Channel 42, via a Fibre Channel 111 (shown with a dotted line), to the FC-AL 63. If a failure occurs in the FC-AL 62, the PBC 102 connects the back interface connection Fibre Channel 42, via a Fibre Channel 112 (shown with a dotted line), to the FC-AL 64.

Likewise, PBCs 103 and 104 are installed respectively between the PBC 37 and the FC-ALs 63 and 64. If a failure occurs in the FC-AL 63, the PBC 103 connects the back interface connection Fibre Channel 52, via a Fibre Channel 113 (shown with a dotted line), to the FC-AL 61. If a failure occurs in the FC-AL 64, the PBC 104 connects the back interface connection Fibre Channel 52, via a Fibre Channel 114 (shown with a dotted line), to the FC-AL 62.

Assuming that all the PBCs 101 to 104 installed on the respective controllers 20 and 30 are connected to the Fibre Channels 111 to 114 and the back interface connection Fibre Channels 42 and 52 are thereby connected respectively to the FC-ALs 61 to 64 of the opponent controllers 30 and 20, this state is the same as that shown, for example, in FIG. 1 of Japanese Patent Laid-Open (Kokai) Publication No. 2000-187561 where a Fibre Channel group that connects both controllers is connected to a plurality of disk drives.

Figure 2:
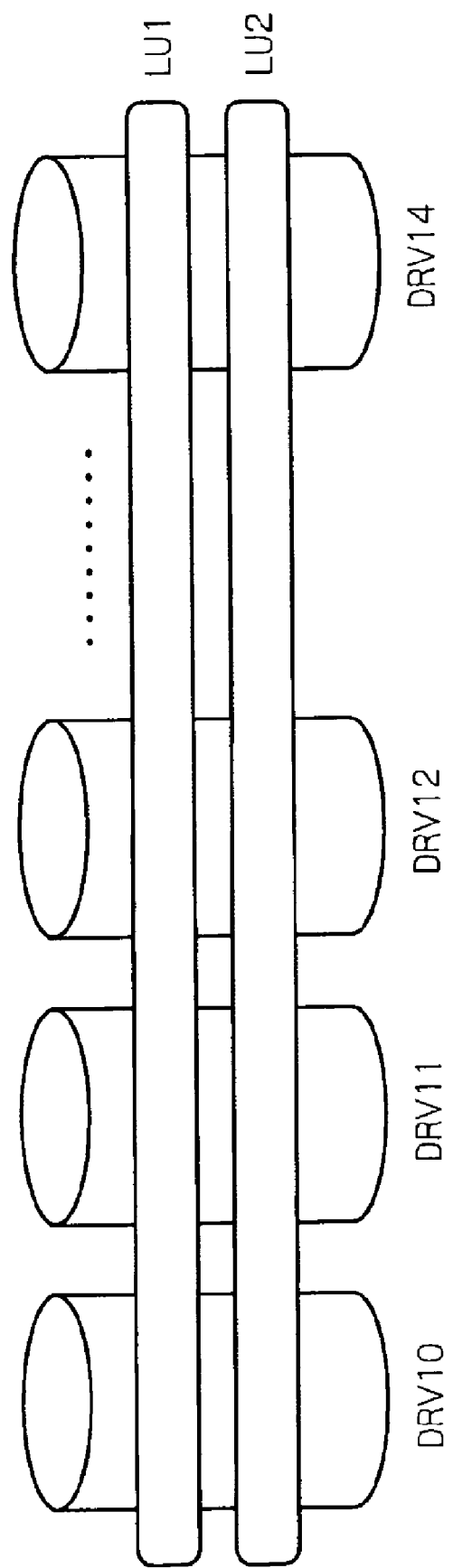
FIG. 2 is an explanatory diagram of logical volumes.

FIG. 2 shows logical volumes formed with a plurality of disk drives DRV0 to DRV14. For ease of explanation, two logical volumes LU1 and LU2 are shown in FIG. 2. The OS (Operating System) installed in the host computer 70 accesses the disk array apparatus 10 by designating the logical volume name. Assuming that there is only one physical disk that constitutes each logical volume LU1 or LU2, if that physical disk fails, the logical volume LU1 or LU2 becomes unavailable. In order to prevent this situation, the RAID system is configured in such a way that the respective logical volumes LU1 and LU2 are formed on different plural disk drives DRV0 to DRV14. Moreover, the operating FC-AL 61 of the controller 20 is connected to the even-number disk drives DRV0, DRV2, and so on to DRV14, while the operating FC-AL 64 of the controller 30 is connected to the odd-number disk drives DRV1, DRV3, and so on to DRV13. Therefore, a configuration may be employed wherein access to each logical volume LU1 or LU2 is not always conducted by either one of the controllers 20 and 30, but sometimes both the controllers 20 and 30 cooperate to access the logical volumes LU1 and LU2 under cooperative control.

When the host computer 70 write-accesses the logical volume LU1 or LU2 of the disk array apparatus 10, write data stored in the cache memory 24 in the controller 20 is also stored in the cache memory 34 in the other controller 30 via the bus 81. By having dual data in this manner, it is possible to implement fail-over by switching to the other controller 30 even if a failure occurs in the controller 20.

When the write data is stored on the cache memories 24 and 34, the disk array apparatus 10 gives notice of write-access completion to the host computer 70. Then, the controller 20 write-accesses the disk drives DRV0, DRV2, and so on to DRV14 via the FC-AL61. Since the write-accessed logical volume LU1 or LU2 includes not only the even-number disk drives DRV0, DRV2, and so on to DRV14, but also the odd-number disk drives DRV1, DRV3, and so on to DRV13, the controller 30 write-accesses the odd-number disk drives DRV1, DRV3, and so on to DRV13 via the FC-AL 64.

On the other hand, when the host computer 70 read-accesses the logical volume LU1 or LU2 of the disk array apparatus 10, the controller 20 checks the cache memory 24. If the cache memory 24 has the target data for the read-access, the controller 20 reads the data and sends it to the host computer 70. If the cache memory 24 has no relevant data, the controller 20 read-accesses the disk drives DRV0, DRV2, and soon to DRV14 via the FC-AL 61. Since the read-accessed logical volume LU1 or LU2 includes not only the even-number disk drives DRV0, DRV2, and so on to DRV14, but also the odd-number disk drives DRV1, DRV3, and so on to DRV13, the controller 30 read-accesses the odd-number disk drives DRV1, DRV3, and so on to DRV13 via the FC-AL 64.

The data read by the respective controllers 20 and 30 is dually written to the cache memories 24 and 34.

As both the controllers 20 and 30 under cooperative control cooperate to make access to one logical volume, it is possible to equalize the processing load of the respective controllers 20 and 30. This embodiment describes the case where the processing load of the controllers 20 and 30 is equalized by dividing the disk drives into two groups, that is, the even-number disk drives DRV0, DRV2, and so on to DRV14 and the odd-number disk drives DRV1, DRV3, and so on to DRV13. However, the processing load of the controllers 20 and 30 may be equalized by dividing the disk drives into two groups, for example, the disk drives DRV0 to DRV7 and the disk drives DRV8 to DRV14, so that the number of disk drives that each controller 20 or 30 takes charge of is approximately the same.

Moreover, in this embodiment, all the disk drives DRV0 to DRV14 are connected to either controller 20 or 30 merely by controlling the two PBCs 27 and 37 and connecting the back interface connection Fibre Channels 42 and 52 to the operating FC-ALs 61 and 64. Accordingly, it is unnecessary to individually control the PBCs 82 mounted respectively on the FC-ALs 61 to 64, and their control is easy. Furthermore, the CPUs 21 and 31 do not distinguish the operating FC-ALs from standby FC-ALs within their controllers and recognize them as the same device, thereby enabling easy control.

Next, a disk drive failure is described below. Examples of the types of disk drive failure include SCSI failure, Fibre failure, and time-out failure. The first two types are rigid failures. If these types of failure occur in a disk drive, the disk drive is locked-out and then replaced by a new disk drive. On the other hand, time-out failure is a temporal failure of hardware or software in a disk drive and thereby can be normally recovered. However, the failure may not be repeatable in many cases and, therefore, the disk drive in which the time-out failure has occurred is locked-out and then replaced by another disk drive.

Whether such a failure has occurred or not is determined, for example, when the CPU 21 receives an error message from a suspected faulty disk drive via the Fibre Channel protocol controller 25 and then the data controller 23, or when acknowledgement from the disk drive to which a command was sent has not reached the CPU 21 within a specified period of time (i.e., time-out). The CPU 21 sets or stores an AL_PA (Arbitrated Loop Physical Address) of, for example, the suspected faulty disk drive (the disk drive that is suspected of suffering a failure) on the FC loop, as well as the type of failure, in a specified storage area of, for example, the system memory 22 or the cache memory 24.

Figure 3:
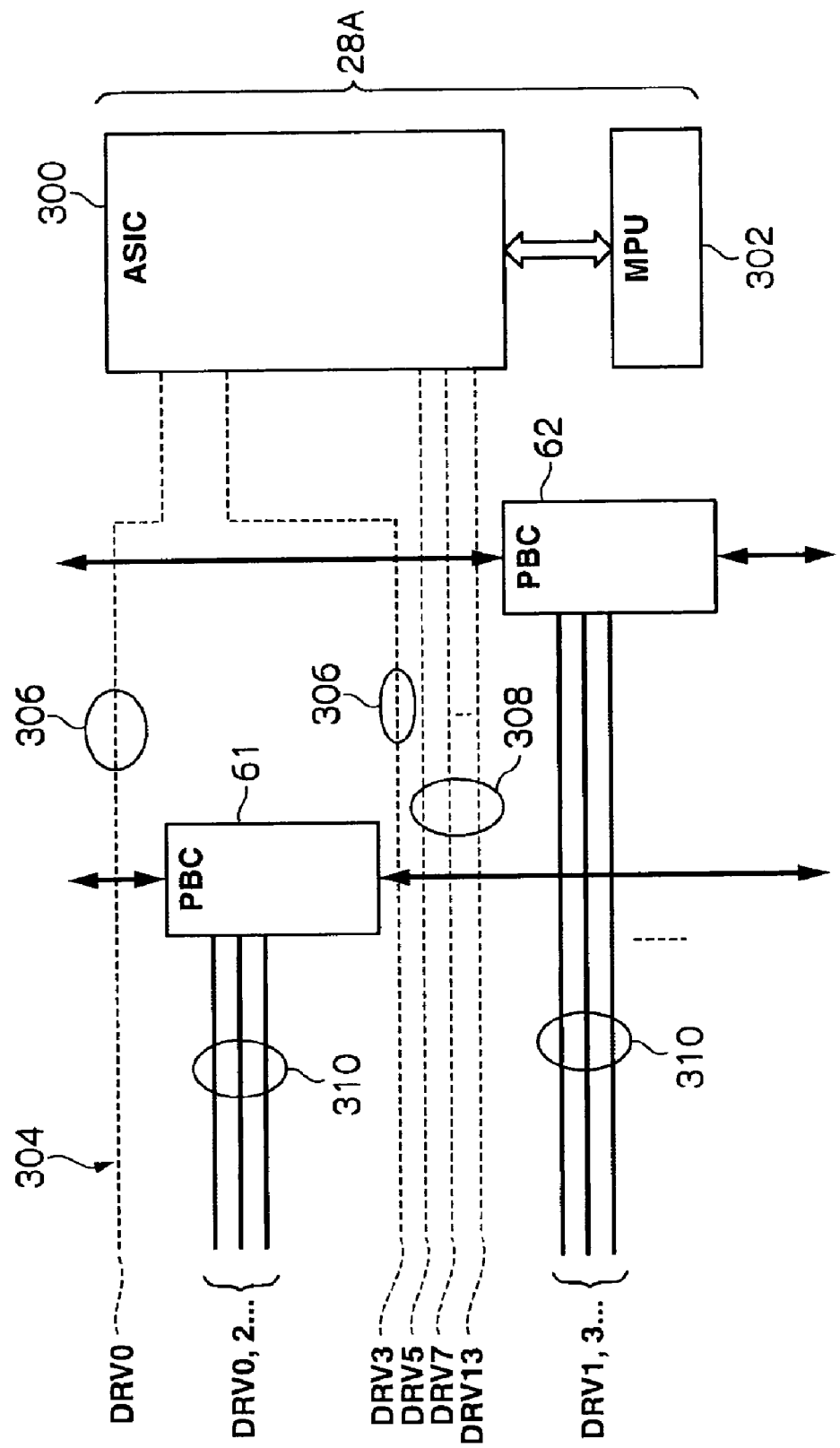
FIG. 3 is a functional block diagram of an enclosure controller of the disk array apparatus.

FIG. 3 shows a circuit block configuration of the E-CLT 28 (or 38) and its peripheral devices. The E-CLT 28 consists of an ASIC (Application Specific Integrated Circuit) 300 and an MPU 302. Signal transmission lines 304 extend from the ASIC 300 to the respective disk drives. Signal lines 306 for SES commands (SCSI commands) and hard reset instructions that can be recognized by SES drives (DRV0 and DRV3) for drive diagnosis are formed between the ASIC 300 and the SES drives. Signal lines 308 for a hard reset signal are formed between the ASIC 300 and the non-SES drives. Between the PBC 61 or 62 and the respective disk drives, Fibre Channel lines 310 are formed through which commands (such as read commands and write commands) other than SES commands are sent and received.

"Hard reset" is to reset, by means of hardware, the whole or part of the circuit of a chip (such as an FC protocol chip or CPU) that constitutes the electronic circuit of the disk drive. In other words, the "hard reset" is the processing to initialize the chip. This hard reset is controlled by a hard reset command. The hard reset of this invention may include a power-on reset of a disk drive. If the hard reset command is not applicable to the relevant disk drive, the power-on reset may be applied to the suspected faulty disk drive. A power-on reset control signal is sent from the enclosure controller via the hard reset signal line to the relevant disk drive. On the other hand, "soft reset" is to terminate software (an application) operating in the disk drive by means of a program. With this invention, the soft reset may be executed before the hard reset. In the disk array system of this invention, the suspected faulty disk drive may be hard reset if it is not recovered by the soft reset.

Referring to FIGS. 1 and 3, the CPU 21 accesses the disk drives in the following manner. The CPU 21 receives or sends commands (such as a read commands and write commands, but excluding SES commands) and data directly from or to the respective disk drives via the FC-ALs 61 to 64 through the signal lines 310 shown in FIG. 3. SES commands are sent to the FC-ALs 61 to 64, the SES drives (DRV0 to DRV3), and the enclosure controller 28 or 38. SES commands are exchanged between the SES drives and the enclosure controller 28 or 38 through the signal lines 306 shown in FIG. 3. The content of the SES commands is analyzed by the SES drives, and the command is read by the MPU 302 of the enclosure controller, and a control instruction corresponding to the command is sent to the target disk drive through the signal line 306 or 308 shown in FIG. 3. The hard reset of a disk drive is executed by an SES command.

The SES command contains the AL_PA of the disk drive to which access is made on the FC loop. The SES drive (DRV0, DRV1, DRV2, or DRV3) receives and reads the Al_PA and the command via the FC-AL, converts the SES command to an E-CLT command and then sends it to the E-CLT 28 (or 38). If the disk drive to be accessed is an SES drive, the E-CLT sends the hard reset instruction to the suspected faulty disk drive via the control signal line (306 in FIG. 3) formed between the E-CLT and the SES drive. If the disk drive to be accessed is not an SES drive, the E-CLT sends the hard reset instruction to the suspected faulty disk drive via the control signal line (308 in FIG. 3). Subsequently, in a time interval shorter than the time-out period of the host computer and after the hard reset processing, the CPU issues a spin-up command to power the drive unit of the suspected faulty disk drive. The electronic circuit of the suspected faulty disk drive receives this command via the FC-AL without the intermediary SES drive. When the mechanical part of the disk drive that received the spin-up command spins up, the CPU (21 or 31) receives a command related to the spin-up completion from that disk drive and determines that the suspected faulty disk drive has been recovered after the hard reset. For example, the CPU repeatedly sends, to the suspected faulty disk drive, a command to inquire whether the disk drive is ready or busy. When the spin-up of the mechanical part of the disk drive is completed, the disk drive turns from a busy state to a ready state and notifies the CPU that it is in the ready state. Receiving this notice, the CPU determines that the hard reset of the suspected faulty disk drive is completed, that is, the suspected faulty disk drive has been recovered. Information to specify the suspected faulty disk drive is stored on one or more storage areas in the system memory 22 (or 32), the cache memory 24 (or 34), and the respective disk drives in FIG. 1. When determining that the suspected faulty disk drive has been recovered, the CPU updates this control information and stores it in a specified area. Regarding the types of spin-up for Fibre Channel disk drives, there is automatic spin-up (the spin-up is conducted automatically once the power is turned on) and command spin-up (the spin-up can be turned on or off while the power is on). In this embodiment, the power-on state of the disk drives is maintained during the hard reset of the Fibre Channel disk drive, and the spin-up command is sent to the suspected faulty disk drive by means of the command spin-up.

Figure 4:
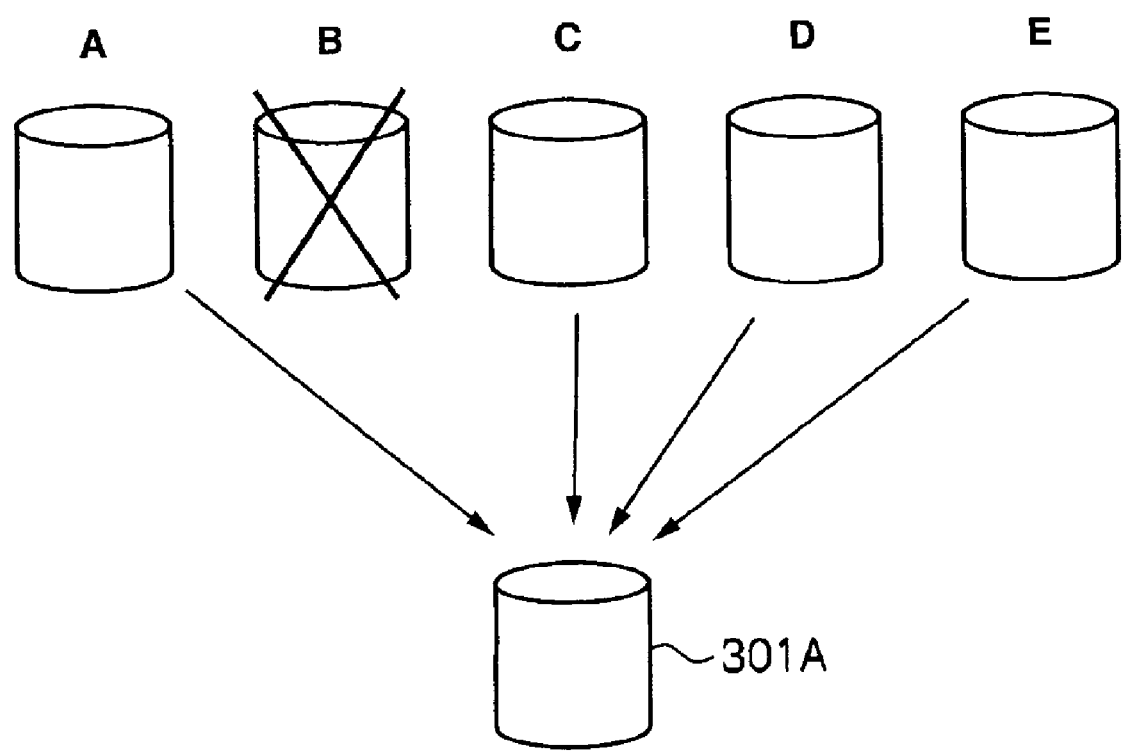
FIG. 4 is a block diagram of a disk array apparatus, including a suspected faulty disk drive, according to an embodiment mentioned below.

Since a certain period of time is required to execute processing to recover the disk drive, including the hard reset, it is possible to recover storage data in the suspected faulty disk drive by utilizing that period of time. For example, it is possible to conduct collection copy by locking-out the suspected faulty disk drive once. FIG. 4 shows the collection copy after the processing to lock-out the suspected faulty disk drive. The storage content of the suspected faulty disk drive B is reproduced from the storage content of the other disk drives A, C, D, and E that constitute the same RAID group with the disk drive B, and the reproduced storage content of the disk drive B is then stored on a spare disk drive 301A. After the collection copy has terminated and after the suspected faulty disk drive has been recovered by the hard reset, the CPU 21 (or 31) can register the recovered disk drive as a spare disk drive with a specified storage area of its memory (at least one of the system memory, the cache memory, and the disk drives). If the disk drive recovery time is shorter than the time-out period of the host computer, the suspected faulty disk drive may be hard reset without lock-out.

The disk drive recovery time varies according to the communication interface applied to the disk drive, and the vendor that supplies the disk drive. Since the disk drive recovery time is influenced by the spin-up of the mechanical drive part of the disk drive, the drive part may be improved or modified so as to shorten the period of time required to reach the spin-up state. The desired recovery time after the hard reset conducted for the faulty disk drive is one shorter than or equal to the time-out period of the host computer (8 to 9 seconds).

Read-access from the CPU to the suspected faulty disk drive during the hard reset of the suspected faulty disk drive is handled in the following manner. If the storage data for which the read-access is made exists in the cache memory 24, the CPU reads and supplies that storage data to the host computer 70. If the storage data for which the read-access is made does not exist in the cache memory 24, the CPU reproduces the data from the other disk drives that constitute the same RAID group with the suspected faulty disk drive (see FIG. 4), and stores the reproduced data in the cache memory 24. If the reproduced data exists in the spare disk 301A (FIG. 4) during the period of lock-out processing for the suspected faulty disk drive, the CPU may read the data from the spare disk, and then store it in the cache memory 24.

On the other hand, write-access is handled in the following manner. The write-access update data is stored as a difference bit map 24A (or 34A) in the cache memory 24 (or 34) as shown in FIG. 1. After the suspected faulty disk drive has been recovered by a hard reset, the difference data in the cache memory 24 (or 34) is written to the recovered disk drive. On the other hand, if the suspected faulty disk drive is locked-out, the difference data is reflected on the spare disk drive after the collection copy.

When hard resetting a suspected faulty disk drive, whether or not the user is notified of the hard reset depends on the situation. For example, when a suspected faulty disk drive is locked-out for a hard reset, and when the RAID level of the RAID group of the suspected faulty disk drive has no dual redundancy (such as RAID5 or other types, excluding RAID6), there is a possibility that the redundancy may be lost during the lock-out period, and the user can be thereby notified that the suspected faulty disk drive is hard reset. The CPU 21 displays, on a host computer 70 display unit, a text string saying that the specific disk drive has been hard reset. However, it is unnecessary to display the above text string when the recovery time of the suspected faulty disk drive is shorter than the time-out period of the host computer, or when the RAID level of the suspected faulty disk drive is one (such as RAID 6) that maintains redundancy even if the suspected faulty disk drive is locked-out.

Figure 5:
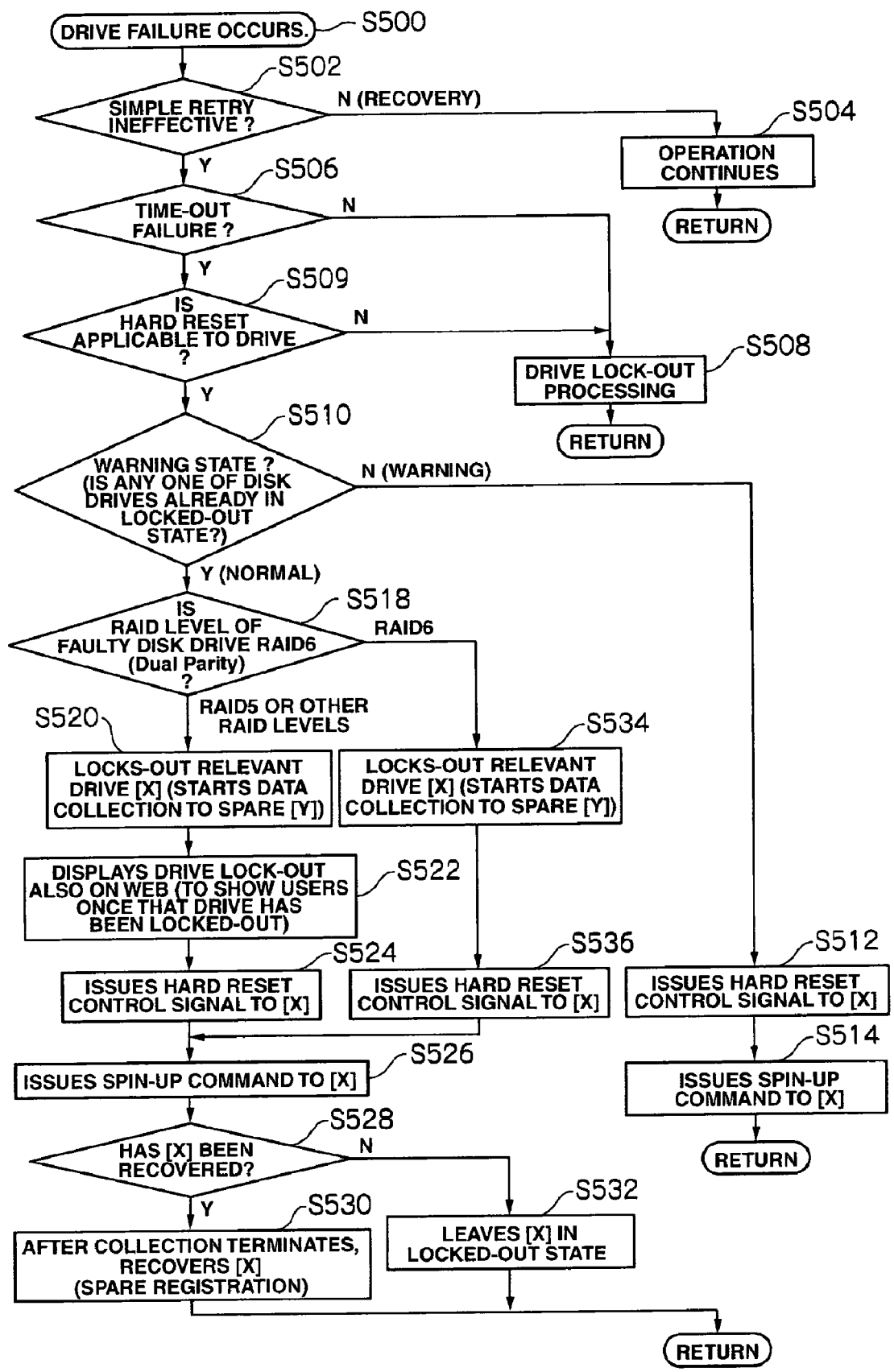
FIG. 5 is a flowchart illustrating a processing sequence to hard reset the suspected faulty disk drive.

Processing to recover a faulty disk drive from the failure is described below with reference to FIG. 5. As described above, when the CPU 21 detects a faulty disk drive, the processing according to the FIG. 5 flowchart starts. The enclosure controller 28 or 38 that has received the SES command sends a retry instruction to the suspected faulty disk drive via the SES drive and the FC-AL loop (S502). If the suspected faulty disk drive executes the retry instruction normally, the CPU cancels the registration of the suspected faulty disk drive with the cache memory or the like and the suspected faulty disk drive continues executing the retried control command (S504).

If the suspected faulty disk drive cannot execute the retry instruction within a specified period of time after the issue of the retry instruction, the CPU examines the details of the failure from, for example, an error code in the cache memory (S506). If the disk drive failure is not a time-out failure, it is considered an unrecoverable failure and the suspected faulty disk drive is locked-out (S508).

If the disk drive failure is a time-out failure, the CPU checks if a hard reset is applicable to the suspected faulty disk drive (S509). The characteristic features of the respective disk drives are registered in, for example, the system memory or the cache memory. The CPU 21 can decide, based on the registration content, whether a hard reset is applicable to the suspected faulty disk drive. If a hard reset is not applicable to the suspected faulty disk drive, the disk drive cannot be recovered by a hard reset. Therefore, the disk drive is locked-out and the processing terminates (S508).

On the other hand, if a hard reset is applicable to the suspected faulty disk drive, the CPU examines whether the disk array apparatus is in a warning state or not (that is, whether any one of the disk drives is already in a locked-out state) (S510). If it is already in a warning state, the suspected faulty disk drive (a further disk drive) cannot be locked-out. So, the CPU hard resets the suspected faulty disk drive (S512) and then issues the spin-up command to the suspected faulty disk drive (S514), thereby recovering the suspected faulty disk drive.

On the other hand, if the disk array apparatus is not in a warning state, the CPU checks the RAID level of the suspected faulty disk drive (S516). If the RAID level is RAID5, the CPU locks-out the suspected faulty disk drive (S518) and starts the aforementioned collection copy (S520). Moreover, the CPU has the host computer display that the suspected faulty disk drive is locked-out (S522). Subsequently, the CPU issues a hard reset control signal to the suspected faulty disk drive (S524). Then, the CPU issues the spin-up command (S526). After issuing the spin-up command, the CPU examines whether the suspected faulty disk drive has been recovered or not (S528). If the suspected faulty disk drive has been recovered, the CPU treats the suspected faulty disk drive as a normal disk drive and registers it as a spare disk drive (S530). On the other hand, if the suspected faulty disk drive is not recovered, the suspected faulty disk drive is replaced after the termination of the collection copy (S532).

If the RAID level of the suspected faulty disk drive is RAID6, the CPU locks-out the suspected faulty disk drive without notifying the host computer of the lock-out (S534) and outputs a hard reset control signal to the suspected faulty disk drive (S536). The subsequent processing is the same as the processing in the case where the RAID level of the suspected faulty disk drive is RAID5. When the suspected faulty disk drive has been recovered properly, that is, when the suspected faulty disk drive is hard reset and its drive part starts rotating, a message indicating the normal operation is delivered via the E-CTL to the CPU.

Figure 6:
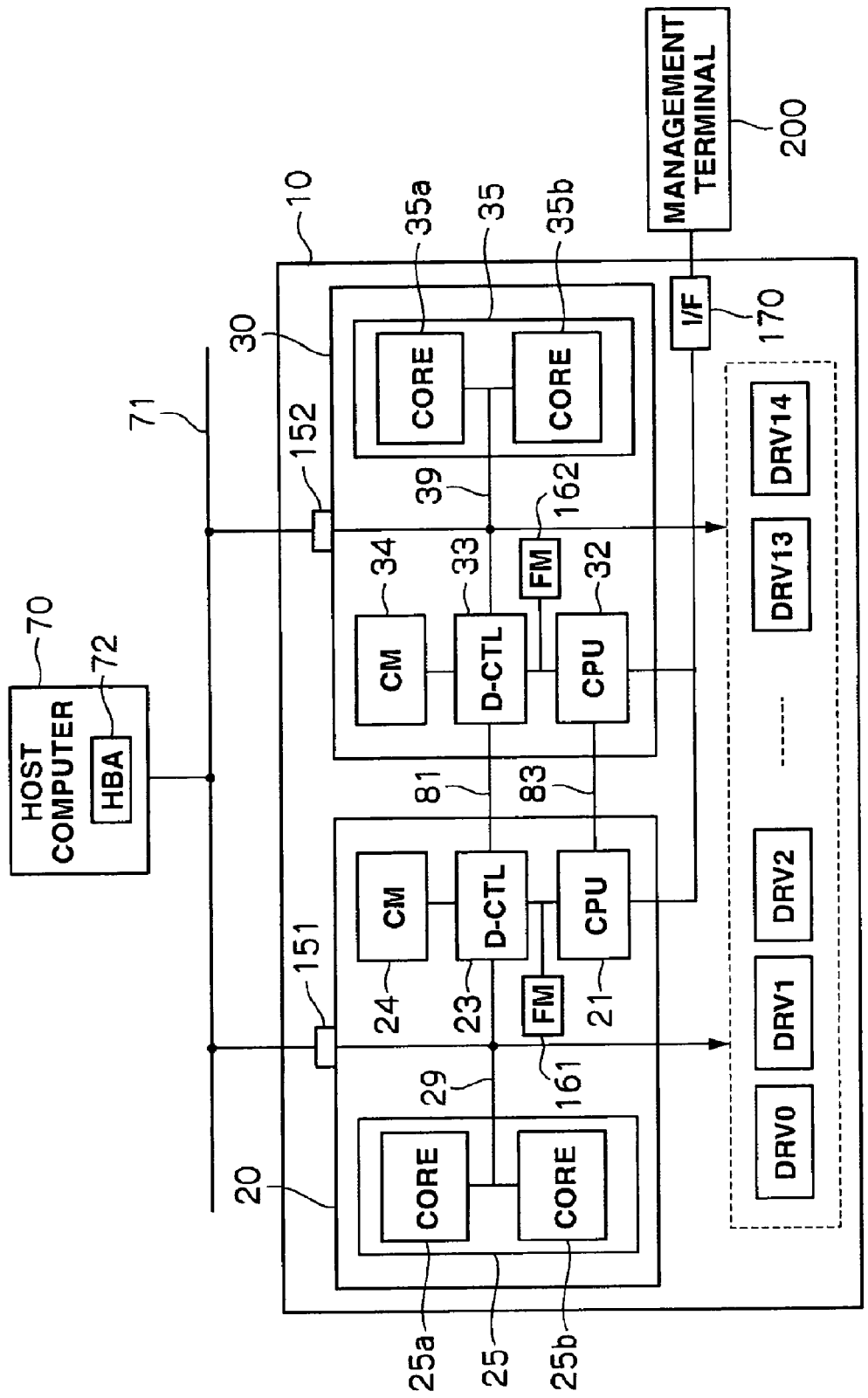
FIG. 6 is a hardware block diagram of another disk array apparatus of this invention.

FIG. 6 shows a disk array apparatus of this invention according to another embodiment of this invention and illustrates the main part of a disk array apparatus 10 focused on Fibre Channel protocol controllers 25 and 35. For ease of explanation, some circuit elements within the controllers (such as the local memories 22 and 32 and the enclosure controllers 28 and 38) and peripheral hardware around the back interface (such as the PBCs 27, 37, and 101 to 104, and the FC-ALs 61 to 64) are omitted in FIG. 6.

The Fibre Channel protocol controller 25 has a circuit configuration in which a front core 25a and a back core 25b are installed in the same LSI. The core 25a is a circuit for controlling the Fibre Channel Protocol in data communications with the host computer 70 and has, for example, the function of accepting block access requests from the host computer 70 according to the Fibre Channel Protocol. The core 25b is a circuit for controlling the Fibre Channel Protocol in data input to and output from the disk drives DRV0 to DRV14 and handles, for example, data input/output requests to the disk drives DRV0 to DRV14 according to the protocol specifying commands and the like for controlling the disk drives DRV0 to DRV14. The cores 25a and 25b are respectively controlled by independent modules.

A PCI-X bus 29 mutually connects the front interface and back interface of the controller 20, the Fibre Channel protocol controller 25, and the data controller 23. The PCI-X bus 29 diverges in two lines within the Fibre Channel protocol controller 25 and is then connected to the cores 25a and 25b. A flash memory (FM) 161 is branch-connected to the PCI-X bus connecting the CPU 21 and the data controller 23 and is configured to be capable of saving disk drive failure information.

The flash memory is indicated as an example of a memory unit, but other nonvolatile memory can also be used. A GBIC module 151 is installed at the front interface of the controller 20. A communication network 71 is, for example, a SAN composed of an optical fiber network. An HBA (Host Bus Adapter) 72 is installed at the interface between the host computer 70 and the communication network 71. The circuit configuration within the controller 30 is similar to that of the controller 20. Reference numeral 35a indicates a front core, 35b indicates a back core, 39 indicates a PCI-X bus, 152 indicates a GBIC module, and 162 indicates a flash memory.

The CPU 21 of the controller 20 and the CPU 31 of the controller 30 are connected via a communication line 83 and are configured so that they can exchange information when any controller failure occurs.

The disk array apparatus 10 is connected, via a communication interface 170, to a management terminal 200 for system maintenance and management. Between the disk array apparatus 10 and the management terminal 200, data communications are conducted according to a specified communication protocol such as Fibre Channel Protocol or TCP/IP. If the communication protocol is Fibre Channel Protocol, a GBIC module and a Fibre Channel protocol controller may be installed at the communication interface 170.

If the communication protocol is TCP/IP, a LAN port connector and an LSI for controlling the TCP/IP may be installed at the communication interface 170. By operating the management terminal 200, an operator can, for example, set logical volumes defined on the disk drives DRV0 to DRV14, add or remove a disk drive(s) to or from the disk drives DRV0 to DRV14, and change the setting of the RAID configuration (such as a RAID level change from RAID5 to RAID1). As described later, when a failure occurs in a disk drive, the management terminal 200 has the function of acquiring the failure information saved on the cache memories 24 and 34 and analyzing the cause of failure. The management terminal 200 may be included in the disk array apparatus 10 or externally attached to the disk array apparatus 10.

Figure 7:
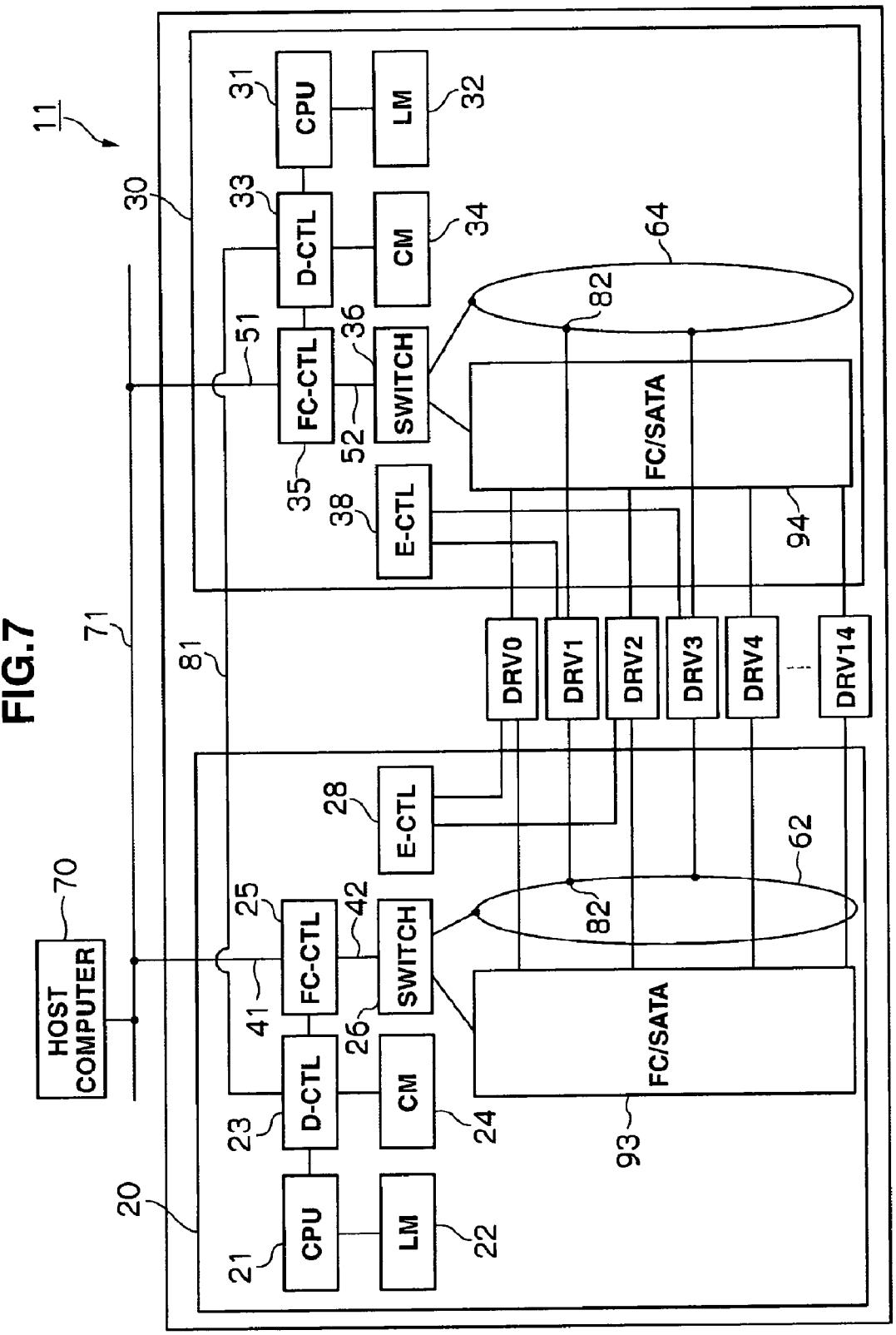
FIG. 7 is a hardware block diagram of yet another disk array apparatus according to this invention.

FIG. 7 shows the configuration of a disk array apparatus 11 according to still another embodiment of this invention. The same reference numerals as are used in FIG. 1 indicate the same devices as those in FIG. 1, and their detailed explanation is thereby omitted. Switches 26 and 36 are included instead of the aforementioned PBCs 27 and 37, as connection switching circuits for the back interface connection Fibre Channels 42 and 52. The switch 26 is connected, via ports with different port IDs, to an FC-SATA conversion interface 93 and the FC-AL 62.

Likewise, the switch 36 is connected, via ports with different port IDs, to an FC-SATA conversion interface 94 and the FC-AL 64. The switches 26 and 36 recognize the devices connected to their ports as independent devices and intelligently switch and control them.

The FC-SATA conversion interfaces 93 and 94 are the circuits for conversion between the Fibre Channel Protocol and the SATA Protocol and are connected point-to-point to the even-number disk drives DRV0, DRV2, and so on to DRV14. As the even-number disk drives DRV0, DRV2, and so on to DRV14, for example, inexpensive Serial ATA disk drives can be used. The FC-ALs 62 and 64 are loop connected to the odd-number disk drives DRV1, DRV3, and so on to DRV13. As the odd-number disk drives DRV1, DRV3, and so on to DRV13, for example, high-performance Fibre Channel disk drives with a high response speed can be used.

Accordingly, if certain data suffers a temporal value change in the disk array apparatus 11, which includes different kinds of disk drives with different response speeds, it is possible to move the relevant data within the same chassis from a Fibre Channel disk drive to a Serial ATA disk drive, or from a Serial ATA disk drive to a Fibre Channel disk drive.

For example, frequently accessed data and data that requires high-speed response may be stored on the Fibre Channel disk drives, while data with a comparatively long access interval and data that does not require a high response speed may be stored on the Serial ATA disk drives. Moreover, as different kinds of disk drives with different response speeds, SCSI disk drives, Parallel ATA disk drives, Serial ATA disk drives, Fibre Channel disk drives, and Serial Attached SCSI (SAS) drives, for example, may be mixed and installed.

Since the connections of the back interface connection Fibre Channels 42 and 52 can be intelligently switch-controlled by utilizing the switches 26 and 36, it is possible to change the data storage place based on the temporal value change or other data factors by connecting the different kinds of disk drives with different performance to the respective ports of the switches 26 and 36.

Hard reset and lock-out processing of a suspected faulty disk drive is performed depending on the type of disk drive. With disk drives for which a hard reset is not applicable, or disk drives for which a hard reset is not effective in its recovery, the disk drives are locked-out without the hard reset.

Figure 8:
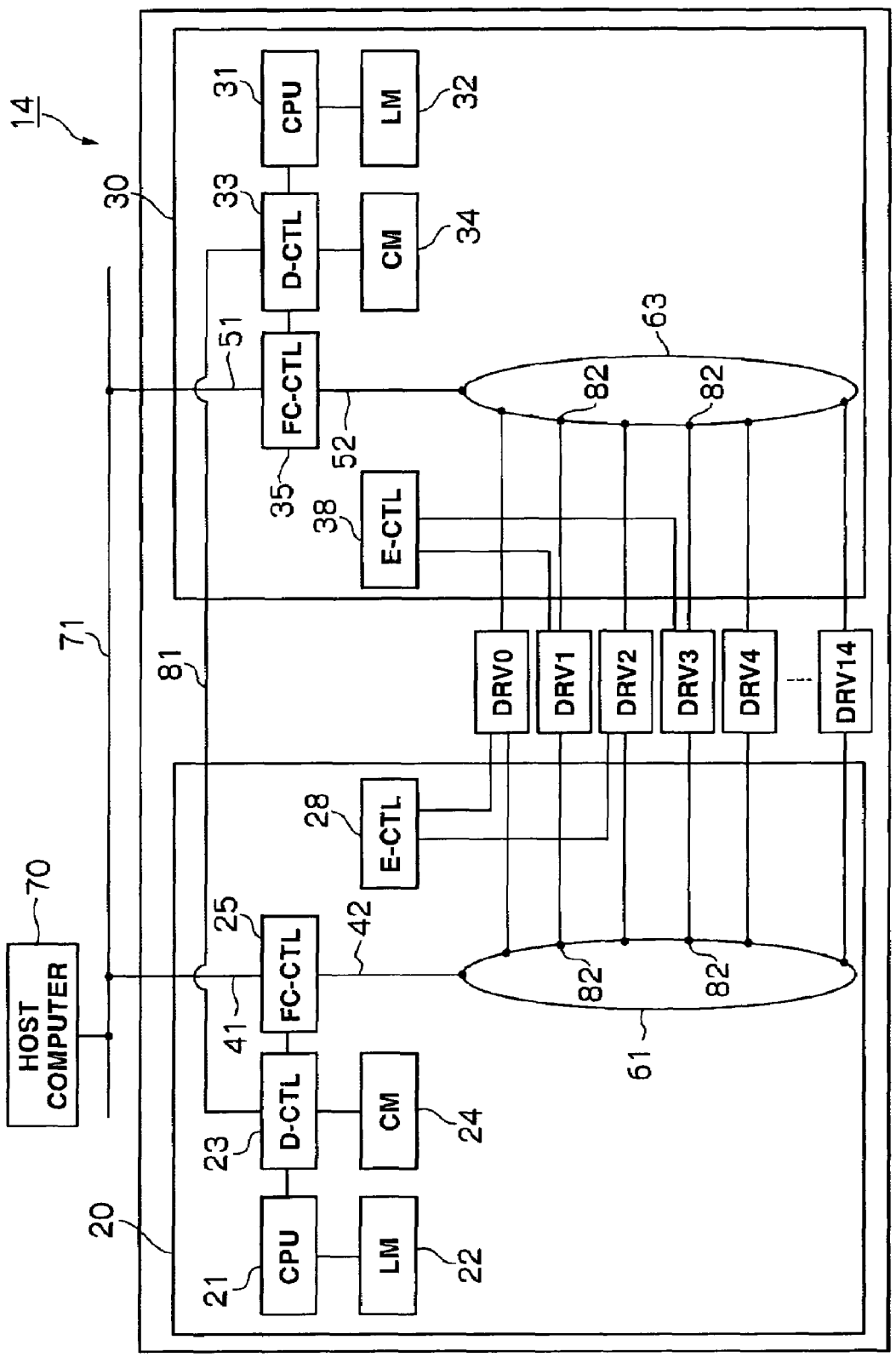
FIG. 8 is a hardware block diagram of still another disk array apparatus according to this invention.

FIG. 8 shows the configuration of a disk array apparatus 14 according to a further embodiment of this invention. The same reference numerals as are used in FIG. 1 indicate the same devices as those in FIG. 1, and their detailed explanation is thereby omitted. The Fibre Channel protocol controller 25 or 35 installed in each controller 20 or 30 is connected, respectively in one path, to the front interface connection Fibre Channel 41 or 51 and the back interface connection Fibre Channel 42 or 52. In each controller 20 or 30, a single FC-AL 61 or 63 is installed and loop-connected to the respective disk drives DRV0 to DRV14. The back interface connection Fibre Channel 42 is connected to the FC-AL 61, while the back interface connection Fibre Channel 52 is connected to the FC-AL 63.

The respective controllers 20 and 30 can write-access or read-access all the disk drives DRV0 to DRV14 via the FC-ALs 61 and 63 respectively. It is possible to statically or dynamically set which controller 20 or 30 write or read-accesses which disk drive DRV0 to DRV14.

For example, the disk drives DRV0 to DRV14, which each controller 20 or 30 write or read-accesses, may be rigidly set so that the controller 20 or 30 responsible can execute the write-access or the read-access of the relevant disk drives DRV0 to DRV14. Also, the controller 20 or 30 responsible may be decided dynamically depending on, for example, the processing load of each controller 20 or 30 and access frequencies. The connections between the respective controllers 20 and 30 and the disk drives DRV0 to DRV14 are controlled by the PBCs 82 installed on the FC-ALs 61 and 63.

Figure 9:
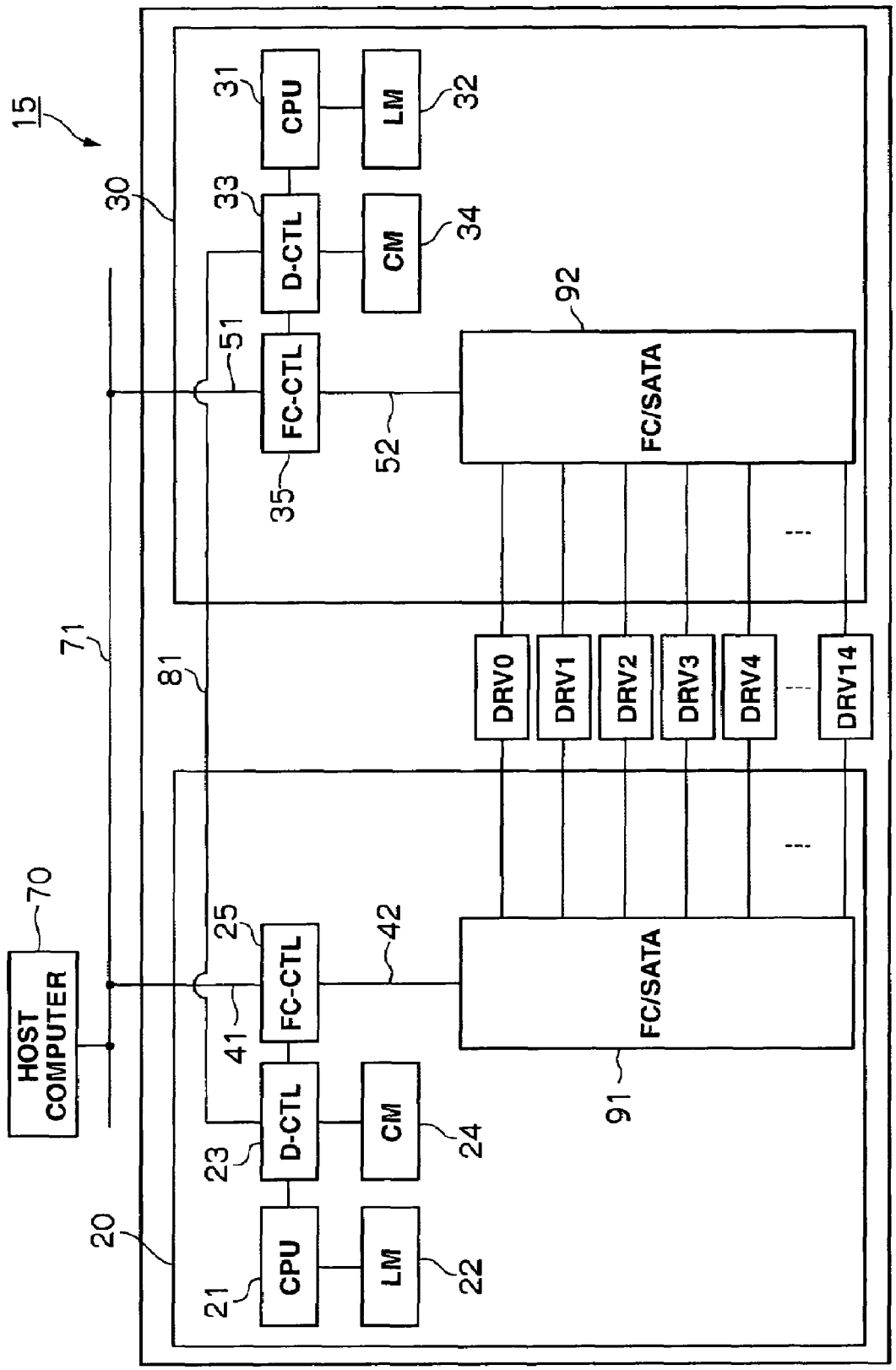
FIG. 9 is a hardware block diagram of a further disk array apparatus according to this invention.

FIG. 9 shows the configuration of a disk array apparatus 15 according to a still further embodiment of this invention. The same reference numerals as are used in FIG. 1 indicate the same devices as those in FIG. 1, and their detailed explanation is thereby omitted. The Fibre Channel protocol controller 25 or 35 installed in each controller 20 or 30 is connected via the front interface connection Fibre Channel 41 or 51 to the host computer 70, and via the back interface connection Fibre Channel 42 or 52 and an FC-SATA conversion interface 91 or 92 to the respective disk drives DRV0 to DRV14.

Since each controller 20 or 30 includes one Fibre Channel protocol controller 25 or 35 and inexpensive Serial ATA disk drives can be used as the disk drives DRV0 to DRV14, it is possible to realize low product cost.

FIG. 10 is a functional block diagram of the disk array apparatus 10, which shows another example of mixed loading of Fibre Channel drives 1008 and 1010 and SATA drives 1006. This disk array apparatus is configured in such a way that an additional chassis 1002 including a plurality of Fibre Channel drives and an additional chassis 1004 including a plurality of SATA drives are connected to a main body 1000. The main unit 1000A has a configuration called a RAID controller for the sake of convenience, and is composed of the CPU 21, the memory 22, the D-CTL 23, the CM 24, the FC-CTL 25, and the PBC 27 shown in FIG. 1.

Although the main body includes a plurality of Fibre Channel drives 1008, it may include none of them. In the second additional chassis, an FC-SATA interface conversion circuit 91 (or 93) is provided at a junction between the SATA drive and the FC-AL 61 (or 63). The E-CTL 28 (or 38) shown in FIG. 1 and the FC-AL 61 (or 63) are provided in the additional chassis. The embodiment of FIG. 10 has a dual controller configuration like that of FIG. 1. It is possible to increase the storage capacity of the disk array system by sequentially connecting additional chassis to the main body 1000.

In light of all the above-described embodiments, the control unit described in the claims is composed of: the CPU 21, the memory 22, the D-CTL 23, the CM 24, the FC-CTL 25, the PBC 27, the E-CTL 28 (or 38), and the FC-AL 61 (or 63). In light of all the above-described embodiments, the main controller described in the claims is composed of: the CPU 21, the memory 22, the D-CTL 23, the CM 24, the FC-CTL 25, the PBC 27, and the E-CTL 28 (or 38).

The main body 1000 changes the content of the hard reset processing depending on the drive type. The Fibre Channel drive is recovered from the suspected faulty state by a hard reset defined by a command (such as the aforementioned SES command). If a hard reset is not applicable to the SATA drive, the CPU sends the power-on reset command via the FC-AL to the suspected faulty disk drive. In the SATA drive, the power-on reset is followed automatically by the spin-up. Therefore, the CPU does not have to send the spin-up command to the SATA drive.

What is claimed is:

1. A disk array apparatus, comprising:
   a plurality of disk drives; and
   a control unit that performs data input/output processing of the disk drives in response to a data input/output request from a host system,
   wherein the control unit includes:
   a memory that stores control information for identifying at least one of the plurality of disk drives as a suspected faulty disk drive, and that identifies failure information of the suspected faulty disk drive,
   a first circuit that identifies, from the failure information, the suspected faulty disk drive that is provisionally categorized as not having recovered from a suspected failure, and that issues a retry instruction to retry a control command to the suspected faulty disk drive, and
   a second circuit that outputs a control signal to the suspected faulty disk drive in order to hard-reset the suspected faulty disk drive if the suspected faulty disk drive does not recover from the suspected failure by normally executing the control command which was retried according to the retry instruction,
   wherein the hard-reset includes initializing a chip that includes an electronic circuit of the suspected faulty disk drive,
   wherein the control unit further determines whether or not the disk array apparatus is in a warning state,
   wherein further, if the disk array apparatus is in the warning state, the control unit hard-resets the suspected faulty disk drive and issues a spin-up command to the suspected faulty disk drive, to render a recovery of the suspected faulty disk drive from the suspected failure,
   wherein further the warning state is a state in which any of the disk drives is already in a locked-out state,
   wherein further the suspected faulty disk drive is a disk drive that has sent an error message or a disk drive from which an acknowledgement has not been received within a specified period of time, and
   wherein further the hard-reset includes power reset of a disk drive.

2. The disk array apparatus according to claim 1, wherein the control unit outputs the hard-reset control signal to the suspected faulty disk drive for which the hard-reset is applicable depending on whether or not the suspected faulty disk drive supports the hard-reset.

3. The disk array apparatus according to claim 1, wherein if the suspected faulty disk drive does not recover in spite of the retry instruction, the control unit further locks-out and hard-resets the suspected faulty disk drive simultaneously.

4. The disk array apparatus according to claim 3, wherein the control unit includes a memory that stores information about an association between the locked-out suspected faulty disk drive and other disk drives that constitute a Redundant Array of Independent Disks (RAID) group and information related to a spare disk drive, and wherein information stored on the locked-out suspected faulty disk drive is restored from others of the plurality of disk drives and is then stored on the spare disk drive.

5. The disk array apparatus according to claim 4, wherein if the locked-out suspected faulty disk drive has recovered subsequent to the hard-reset, the memory registers the control information that indicates the suspected faulty disk drive to be the spare disk drive.

6. The disk array apparatus according to claim 3, wherein the control unit further judges a RAID level of the suspected faulty disk drive with reference to information about a RAID group of the suspected faulty disk drive and the others of the plurality of disk drives, and
  if the RAID level has no dual redundancy, the control unit further outputs, to a notification device, a notification to a user of the lock-out of the suspected faulty disk drive.

7. The disk array apparatus according to claim 1, wherein the hard-reset is to reset at least one hardware components of the disk drive.

8. The disk array apparatus according to claim 5, wherein during a hard-reset period of the suspected faulty disk drive, the control unit further restores, from information stored on the others of the plurality of disk drives, storage data on a read-accessed suspected faulty disk drive, and provides the restored storage data to the host system; and
  for a write-accessed suspected faulty disk drive, the control unit further sets write data as difference information.

9. The disk array apparatus according to claim 1, wherein, during a hard-reset period of the suspected faulty disk drive, the control unit:
  further restores from others of the plurality of disk drives, storage data on the read-accessed suspected faulty disk drive, based on the information about an association between the locked-out suspected faulty disk drive and the other disk drives that constitute the RAID group, and provides the restored storage information to the host system.

10. The disk array apparatus according to claim 1, wherein the control unit further sets storage data in the write-accessed suspected faulty disk drive as difference information.

11. The disk array apparatus according to claim 1, wherein the control unit includes a timer that measures an elapsed time for the suspected faulty disk drive, which is the time elapsed since the suspected faulty disk drive has received the command, and
  wherein further, when the elapsed time exceeds a specified period of time, it is determined that a time-out failure has occurred in the suspected faulty disk drive, and a control memory stores control information that specifies the occurrence of the time-out failure.

12. The disk array apparatus according to claim 11, further comprising the enclosure controller receiving a SCSI SES command including a hard reset command, and outputting the control signal according to the received SES command.

13. The disk array apparatus according to claim 1, wherein the control unit is connected to a plurality of disk drives having different communication interfaces.

14. The disk array apparatus according to claim 1, wherein the circuit for outputting a control signal receives a SCSI SES command includes a hard reset command, then outputs the control signal according to the received SES command.

15. The disk array apparatus according to claim 1, wherein the second circuit is to hard-reset the suspected faulty disk drive if a soft-reset of the suspected faulty disk drive does not render a recovery of the suspected faulty disk drive.

16. A disk array apparatus, comprising:
  a dual controller that performs data input/output processing of disk drives in response to a data input/output request from a host system, the dual controller comprising:
    a main controller that performs the data input/output processing,
    a Fibre Channel (FC) protocol controller that provides an interface connection to the host system via a front interface connection FC, and further provides an interface connection to the disk drive via a back interface connection FC,
    two FC-Arbitrated Loops (ALs) that provide a loop connection to the disk drives,
    a connection switching circuit that switches a connection of a selected one of the two FC-ALs to the back interface connection Fibre Channel,
    a plurality of switching circuits that connect the respective disk drives to the FC-ALs, and
    an enclosure controller that controls the switching circuits,
  wherein the main controller includes:
    a memory that stores control information to identify a suspected faulty one of the disk drives and failure information of the suspected faulty disk drive,
    a first circuit that identifies, from the failure information, the suspected disk drive that is provisionally categorized as not having recovered from a suspected failure, and that issues an instruction to retry a control command from the enclosure controller to the suspected faulty disk drive, and
    a second circuit that outputs a control signal from the enclosure controller to the suspected faulty disk drive in order to hard reset the suspected disk drive if the suspected faulty disk drive does not recover from the failure by normally executing the retry control command;
  wherein the hard reset initializes a chip that includes an electronic circuit of the disk drive,
  wherein the dual controller further determines whether or not the disk array apparatus is in a warning state, and if the disk array apparatus is in the warning state, the dual controller further hard-resets the suspected faulty disk drive and issues a spin-up command to the suspected faulty disk drive to thereby render a recovery of the suspected faulty disk drive from the suspected failure status,
  wherein the warning state is a state in which any one of the disk drives is already in a locked-out state,
  wherein the suspected faulty disk drive is a disk drive that has sent an error message or has not received an acknowledgement within a specified period of time, and
  wherein the hard reset includes power-on reset of a disk drive.

17. The disk array apparatus according to claim 16, wherein the plurality of switching circuits are connected to a plurality of disk drives having different communication interfaces.

18. The disk array apparatus according to claim 17, wherein the control unit further outputs a hard reset signal to the disk drive that employs FC as a communication protocol, and performs processing to lock-out the disk drive that employs Serial Advanced Technology Attachment (SATA) as a communication protocol, without hard-resetting the disk drive that employs SATA as a communication protocol.

19. A disk array apparatus, comprising:
  a plurality of disk drives; and
  a control unit that performs data input/output processing of the disk drives in response to a data input/output request from a host system;

wherein the control unit includes:
a memory that stores control information to identify a suspected faulty one of the plurality of disk drives and failure information of the suspected faulty disk drive;
a circuit that identifies, from the failure information, the disk drive that is provisionally categorized as not having recovered from a suspected failure, and that issues an instruction to retry a control command to the suspected faulty disk drive;
a circuit that outputs a control signal to the suspected faulty disk drive to lock-out the suspected faulty disk drive if the suspected faulty disk drive does not recover from the failure; and
a circuit that receives a Small Computer System Interface (SCSI) Enclosure Services (SES) command that includes a hard reset command and that outputs a reset signal according to the received SES command to the suspected faulty disk drive to hard-reset the suspected faulty disk drive,
wherein the hard reset includes initializing a chip that includes an electronic circuit of the disk drive,
wherein the control unit further determines whether or not the disk array apparatus is in a warning state, and if the disk array apparatus is in the warning state,
wherein the control unit further hard-resets the suspected faulty disk drive and issues a spin-up command to the suspected faulty disk drive to thereby render a recovery of the suspected faulty disk drive suspected failure status,
wherein the warning state is a state in which any one of the plurality of disk drives is already in a locked-out state,
wherein the suspected faulty disk drive is a disk drive that has sent an error message or has not received an acknowledgement within a specified period of time,
wherein, during the hard reset period of the suspected faulty disk drive, the control unit further restores from information stored on the other disk drives, storage data on the read-accessed suspected faulty disk drive and provides the restored storage data to the host system, and
wherein the hard reset includes power-on reset of a disk drive.

20. The disk array apparatus according to claim 19, wherein the control unit further retains, as difference information, data to be written to the write-accessed suspected faulty disk drive.

21. A method for controlling a disk array apparatus including a plurality of disk drives and a control unit for performing data input/output processing of the disk drives in response to a data input/output request from a host system, the method comprising:
identifying a suspected faulty one of the disk drives;
storing failure information of the suspected faulty disk drive;
identifying, based on the failure information, the disk drive that is provisionally categorized as not having recovered from a suspected failure,
issuing an instruction to retry a control command to the suspected faulty disk drive;
hard-resetting the suspected faulty disk drive if the suspected faulty disk drive does not recover from the suspected failure by normally executing the retry control command,
wherein the hard resetting includes initializing a chip that includes an electronic circuit of the disk drive,
determining whether or not the disk array apparatus is in a warning state; and
if the disk array apparatus is in the warning state, hard-resetting the suspected faulty disk drive and issuing a spin-up command to the suspected faulty disk drive, thereby rendering a recovery of the suspected faulty disk drive from the suspected failure status,
wherein the warning state is a state in which any one of the disk drives is already in a locked-out state, and
wherein the suspected faulty disk drive is a disk drive that has sent an error message or has not received an acknowledgement within a specified period of time, and
wherein the hard resetting includes power-on resetting of a disk drive.

22. The disk array apparatus according to claim 21, wherein the hard-resetting of the suspected faulty disk drive is preceded by attempting to soft-reset of the suspected faulty disk drive to render a recovery of the suspected faulty disk drive.

* * * * *